United States Patent [19]
Stefancin, Jr.

[11] Patent Number: 5,341,929
[45] Date of Patent: Aug. 30, 1994

[54] KEYBOARD TRAY ASSEMBLY

[76] Inventor: Ronald J. Stefancin, Jr., 30412 Center Ridge Rd., Westlake, Ohio 44145

[21] Appl. No.: 60,522

[22] Filed: May 13, 1993

[51] Int. Cl.⁵ ............................................. B65D 85/00
[52] U.S. Cl. ................................. 206/320; 248/442.2; 248/454; 248/917; 312/208.2; 312/208.4
[58] Field of Search ............... 206/45.28, 305, 320, 206/576; 248/442.2, 444.1, 449, 451, 452, 454, 650, 917, 918, 923; 312/208.2, 208.4

[56] References Cited
U.S. PATENT DOCUMENTS

| | | | |
|---|---|---|---|
| 500,715 | 7/1893 | Leslie | 248/442.2 |
| 3,086,658 | 4/1963 | Palmer | 248/444.1 |
| 4,044,980 | 8/1977 | Cummins | 206/305 |
| 4,555,128 | 11/1985 | White et al. | 248/451 |
| 4,568,056 | 2/1986 | Lewinski | 248/918 |
| 4,635,893 | 1/1987 | Nelson | 248/918 |
| 4,913,390 | 4/1990 | Berke | 248/918 |
| 5,041,770 | 8/1991 | Seller | 318/265 |
| 5,048,784 | 9/1991 | Schwartz | 248/244 |
| 5,082,229 | 1/1992 | Dahl | 248/444.1 |
| 5,101,736 | 4/1992 | Bommarito | 108/7 |
| 5,112,020 | 5/1992 | Ginsberg | 248/456 |
| 5,196,993 | 3/1993 | Herron et al. | 248/923 |
| 5,214,574 | 5/1993 | Chang | 206/305 |

*Primary Examiner*—David T. Fidei

[57] ABSTRACT

An adjustable keyboard tray assembly equipped with a clasp to retain and support computer keyboards or the like in an adjustable downward angle to the user's best advantage. A copy stand is included to hold documents for data entry and the tray and copystand can be folded over the keyboard to a flattened arrangement to facilitate storage.

9 Claims, 3 Drawing Sheets

KEYBOARD TRAY ASSEMBLY

FIELD OF THE INVENTION

This invention pertains to a tray assembly for holding a computer keyboard so that the keyboard is angled downward, away from the user. More particularly, the tray assembly incorporates a document holder and is collapsible for easier storage.

BACKGROUND OF THE INVENTION

The advent of computers has brought about the need for improved keyboards supports. The time spent by individuals using keyboards has substantially increased with the increased use of personal computers throughout our nation and the world. Personal computers are currently deemed indispensable in business, commercial or professional environments, and most offices are equipped with personal computers for word processing and data storage. PC's are currently found in one-third of the households in America. It is estimated that eighty percent of homes across the United States will have personal computers within the next several years.

Some occupations require spending the entire day at the keyboard. The constant, repetitive hand, wrist and forearm movements can irritate the nerves which radiate between the radius and ulna in the wrist. The potential for nerve irritation is increased because the keyboard is ordinarily slanted upward toward the user; the user's hands reach upward for the keys and the wrists are stretched upward. The nerve irritation can result in repetitive strain injuries, most commonly carpal tunnel syndrome.

The potential for incurring such strain injuries can be diminished by an adjustable tray for positioning the keyboard to slope away from the user.

A solution for avoiding neck and back strains, which may be incurred because the user must look downward at the data for entry, is a copystand integral with the keyboard tray to allow the user to sit upright with back and neck in straightened position.

Therefore, it is a principal object of the invention to provide a keyboard tray assembly to retain a keyboard in position sloping downward from the user.

Another object of the invention is to make the keyboard tray adjustable, so that the user can fix the keyboard in the most comfortable position.

A further object of the invention is to provide an upright copystand designed to be integral with the keyboard tray, thereby eliminating the tendency for the user to hunch over while entering data.

Yet another object of the invention is the provision of a keyboard support or tray which is collapsible to an essentially flattened arrangement for storage of the keyboard and tray.

SUMMARY OF THE INVENTION

These and other objectives are achieved by providing a tray assembly for holding a keyboard for a computer or the like on an essentially horizontal surface, wherein an elevated platform of sufficient size supports the keyboard. The elevation is accomplished by a leg positioned near the first end of the platform for sloping the keyboard downward away from the user.

The leg is preferably formed from a contiguous segment of the platform, and a contiguous portion of the leg forms a clasp near the first end of the platform. An end portion of the clasp projects above the platform, thereby disposed to receive and retain a frontal piece of the keyboard frame. The upper surface of the clasp also serves as a hand support.

A copystand, which includes a connector arm, a backplate and a coverplate, is provided with the tray assembly. The connector arm interconnects the second end of the platform with the backplate which extends upward from the horizontal surface. A portion contiguous with the backplate forms the coverplate with a space maintained between the backplate and coverplate for insertion and removal of documents. The coverplate is transparent to visualize the documents.

The leg and connector arm heretofore described are rotatably connected to the platform by first and second hinges having limited rotation, but adapting the tray and hand rest assembly to be folded into an essentially flat configuration for storage. One or more foot portions are provided to project from the bottom of the leg portion for adjustment in elevation of the platform to slope the tray to the user's advantage.

DETAILED DESCRIPTION OF THE PREFERRED EMBODIMENT

Figure 1:
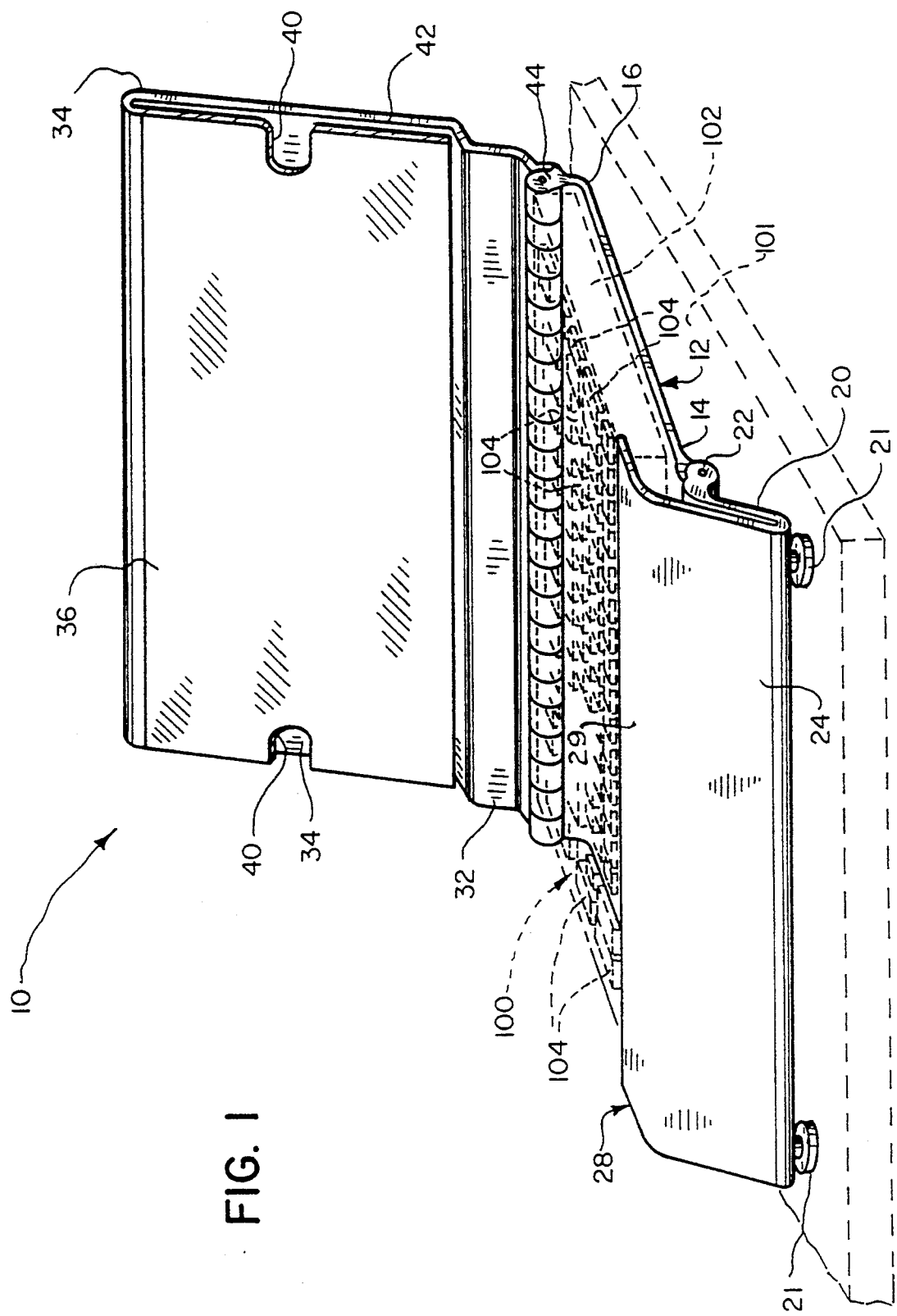
FIG. 1 is a perspective view of the Keyboard Tray Assembly of the invention shown in operative arrangement supporting a keyboard.
Figure 2:
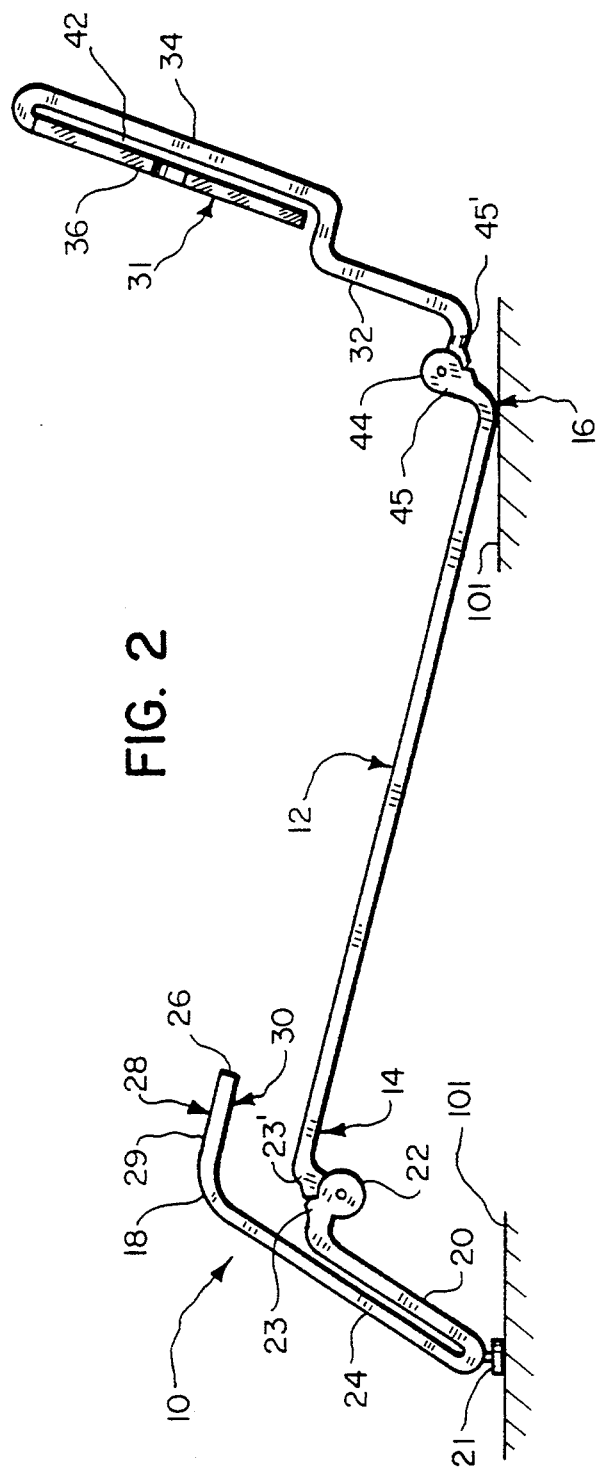
FIG. 2 is a side view of the Keyboard Tray Assembly of the invention.

Referring now to FIG. 1 and FIG. 2 of the drawings, the keyboard tray assembly 10 of the invention includes a platform 12 having a first end 14 and second end 16, sufficient size to support a keyboard 100. Platform 12 may be a solid plate or, alternatively, striated, designed to include various slits and/or slots; another alternative is a platform having a framework with interconnecting, spaced-apart bars. Such construction would expedite accessing the connector cord to the back of the keyboard.

A clasp 18 is positioned near the first end 14 of the platform 12; and, there is a leg 20 associated with said first end 14 of the platform 12 to elevate that first end. The platform 12 is thus sloped downward away from the user, or from the first elevated end 14 to said second end 16, downward toward the horizontal surface 101. This design, effectively sloping the keyboard down and away from the user, allows the forearms of the keyboard typist to remain in a straight line, parallel to the floor. The concomitant result is that the wrists of the user are either straight or slightly contracted, rather than extended or flexed upward.

One or more foot portions 21 are provided to project from the bottom of the leg 20 for adjustment in elevation of the platform 12 to slope the platform and keyboard to the user's advantage. Foot portion 21 may be one or more adjustable, threaded screws as shown in FIG. 2, or a telescoping portion of the leg 20.

Computer keyboards generally have a frame 102, keys 104 projecting upward from the frame, and a frontal piece 106 of the frame nearest the user.

The leg 20 is preferably formed from a contiguous segment of the platform 12, wherein the segment is bent downward toward the horizontal surface 101. The clasp 18 is formed from an upward extending portion 24 contiguous with the leg 20, which upward extending portion is curved upon itself to extend upward essentially parallel with the leg, and an end portion 26 contiguous with the upward extending portion 24. The end portion 26, having upper 28 and lower 30 surfaces, then bends to project above the platform 12, whereby it is disposed to receive and retain the frontal piece 106 of keyboard 100. The keyboard is essentially clasped or snap locked between platform 12 and the lower surface 30 of the end portion 26 which forms clasp 18. Meanwhile, the upper surface 28 of the end portion 26 forms a hand and wrist support 29. FIG. 2 indicates that the wrist support 19 includes a slight curvature and is disposed just above the keyboard to enhance ergonomic support of the wrists.

Figure 3:
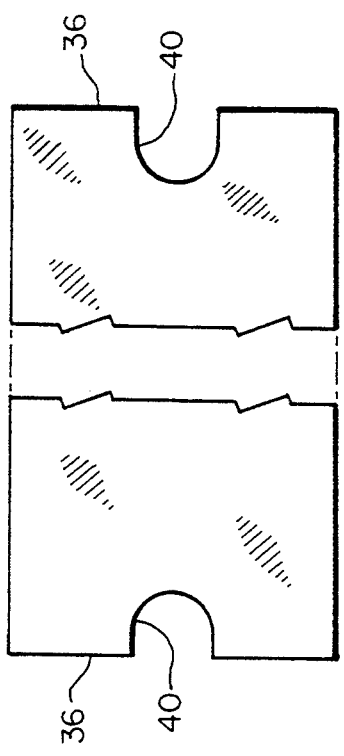
FIG. 3 is a front plan view of the transparent coverplate of the copystand with slots for insertion and removal of documents.

A copystand 31 which includes a connector arm 32, a backplate 34 and a coverplate 36 is preferably included with the tray assembly 10. The connector arm 32 interconnects the second end 16 of the platform 12 and the backplate 34, so that the backplate 34 extends upward from the horizontal surface 101. Connector arm 32 may be offset, effectively dog-legged, to facilitate folding the backplate over a keyboard. The backplate 34 then curves upon itself to form a contiguous portion extending downward essentially parallel to the backplate to form the coverplate 36. A space 42 is maintained between the backplate 34 and coverplate 36 for insertion and removal of documents (not shown), by means of slots 40. (See FIG. 3.) Coverplate 36 is preferably transparent to visualize the documents. However, as indicated with respect to the platform 12, the backplate and coverplate are not necessarily formed in a solid sheet or plate. The copystand components may include various slits and/or slots or, in the alternative, have a framework with interconnecting, spaced-apart bars, or such other interstitial construction known in the art.

In the preferred embodiment, the leg 20 heretofore described is rotatably connected to the first end 14 of the platform 12 by a first hinge 22. That first hinge 22 includes a detentes 23,23' which effectively limit the range of rotation of the leg 20 relative to the platform 12, so that the angle formed between the platform and said leg is less than 120°. More preferably, the angle between leg 20 and platform 12 is 110°.

Figure 4:
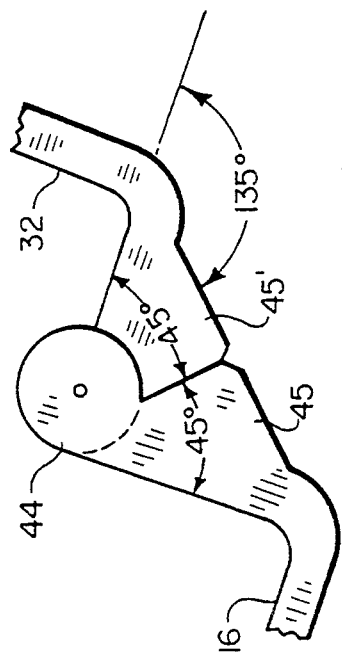
FIG. 4 is an enlarged view of the area of the second hinge which interconnects the platform and the connector arm.

Reference to FIG. 2 and FIG. 4 indicates that connector arm 32 is likewise rotatably connected to the second end 26 of the platform 12 by a second hinge 44, such that the keyboard tray assembly 10 can be folded into an essentially flat configuration for storage. Detentes 45,45' on the second hinge 44 effectively limit the range of rotation of connector arm 32, so that the angle formed between the platform 12 and the backplate 34 is less than 120°. More preferably, the angle between platform 12 and backplate 34 is 90°.

Figure 5:
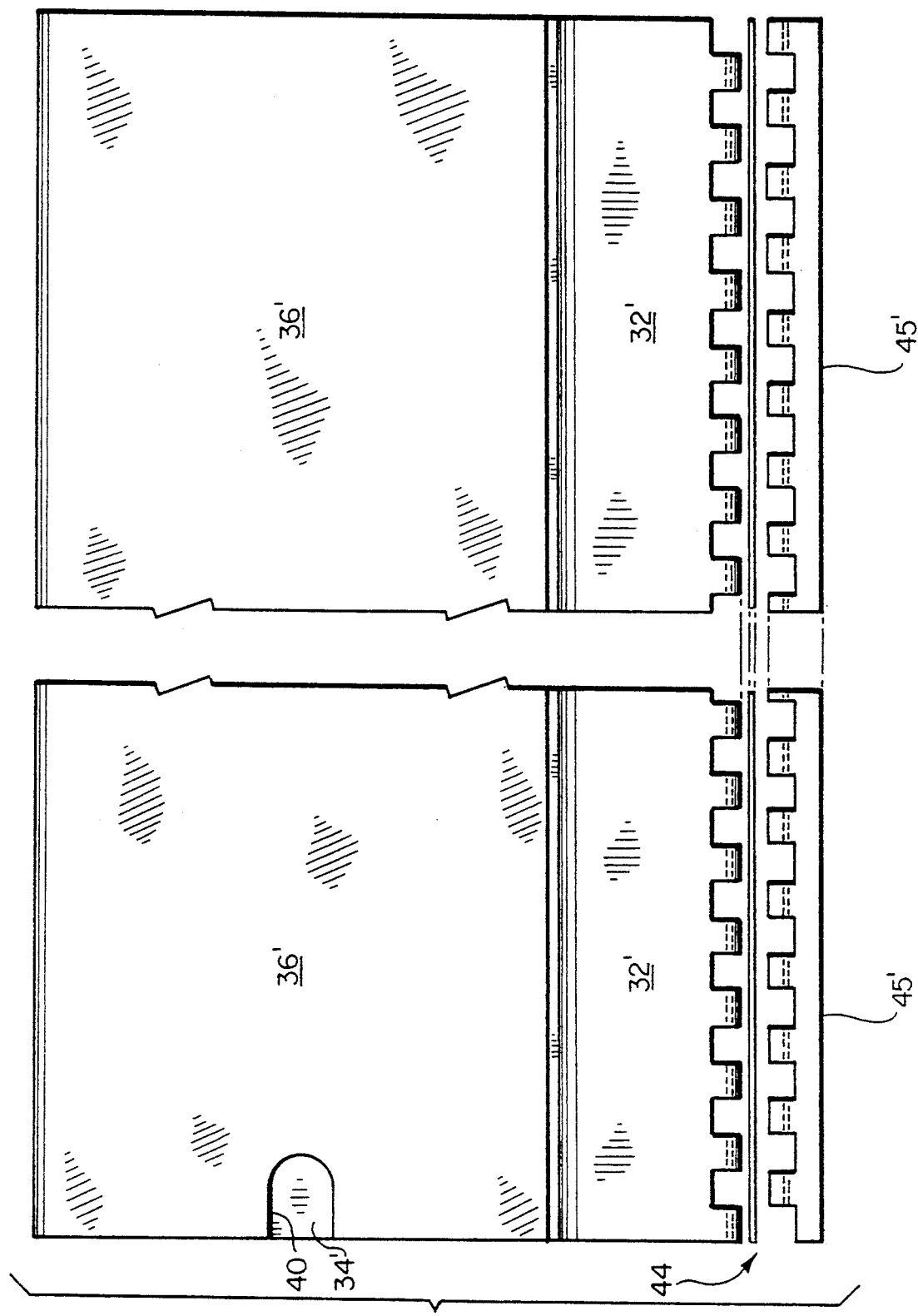
FIG. 5 is a plan view showing interchangability of copystands by means of the second hinge.

FIG. 5 demonstrates that variously sized copystands can be interconnected with platform 12 of the keyboard tray by means of second hinge 44. Thus a larger copystand having connector arm 32', backplate 34', coverplate 36' and space 42' can be interchanged in the device as required.

One or more slots 40 are cut on the periphery of the transparent coverplate for removal and replacement of documents.

While the preferred embodiments for a keyboard tray according to the invention have been disclosed herein, it will be appreciated that many changes and modifications may be made therein without departing from the essential spirit of the invention and the scope of the claims.

I claim:

1. A tray assembly for holding a keyboard on an essentially horizontal surface, the keyboard having a frame, keys projecting upward from the frame, and a frontal piece of the frame nearest the user, said tray comprising:

a platform having first and second ends and sufficient dimensions to support the keyboard frame;

a leg associated with said first end to elevate the first end of the platform from said horizontal surface; the leg formed from a contiguous segment of the platform, said segment bent downward toward the horizontal surface;

a clasp near the first end, the clasp having upper and lower surfaces; the clasp formed from a portion contiguous with said leg curved upon itself to extend upward, said portion essentially parallel with the leg, and an end portion contiguous with the upward extending portion; said end portion bent to project above the platform and disposed to receive and retain said frontal piece of the keyboard between said platform and said lower surface of the clasp formed by the end portion; said upper surface of the clasp adapted to form a hand support;

means for adjusting the length of said leg to vary height of the first end of the platform and a slope of said keyboard; and, a copy stand having a connector arm, a backplate and a coverplate; said connector arm interconnecting said second end of the platform and said backplate; said connector arm and backplate positioned to extend upward from the horizontal surface; and the backplate curved upon itself to form a portion contiguous with the backplate to extend downward essentially parallel to said backplate to form the coverplate; said backplate and coverplate having a space therebetween to receive a document.

2. The tray assembly of claim 1, wherein said coverplate is transparent.

3. The tray assembly of claim 2, wherein said leg is rotatably connected to said first end of the platform by a first hinge.

4. The tray assembly of claim 3, further comprising abutting detentes on said first hinge, said detentes effectively limiting the range of rotation of said leg, such that the angle formed between said platform and said leg is less than 120°.

5. The tray assembly of claim 4, wherein said connector arm is rotatably connected to said second end of the platform by a second hinge; said tray and hand rest assembly adapted to fold upon itself in an essentially flat configuration for storage.

6. The tray assembly of claim 5, further comprising abutting detentes on said second hinge, said detentes effectively limiting the range of rotation of said connector arm, such that the angle formed between said platform and said leg is less than 120°.

7. The tray assembly of claim 6, wherein at least one slot is cut on the periphery of said coverplate for removal and replacement of documents.

8. The tray assembly of claim 7, wherein the means for adjusting is an adjustment screw which forms an extendable foot projecting from the leg for adjusting elevation of the platform and keyboard to the user's advantage.

9. The tray assembly of claim 7, wherein the means for adjusting is a telescoping portion projecting from said leg for adjusting elevation of the platform and keyboard to the user's advantage.

* * * * *